US007676171B2

(12) United States Patent
Swantner et al.

(10) Patent No.: US 7,676,171 B2
(45) Date of Patent: Mar. 9, 2010

(54) PRINTING DEVICE AND METHOD FOR SWITCHING BETWEEN MONOCHROME AND COLOR MODES

(75) Inventors: Richard L. Swantner, Boise, ID (US); Jeffrey L. Trask, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 523 days.

(21) Appl. No.: 11/796,090

(22) Filed: Apr. 26, 2007

(65) Prior Publication Data

US 2008/0267655 A1 Oct. 30, 2008

(51) Int. Cl.
*G03G 15/00* (2006.01)
*G06F 3/12* (2006.01)

(52) U.S. Cl. ........................................ 399/85; 358/1.13

(58) Field of Classification Search .................. 399/54, 399/82, 85, 223, 228, 298, 299; 359/1.13, 359/296, 300
See application file for complete search history.

(56) References Cited

U.S. PATENT DOCUMENTS 4,847,654 A * 7/1989 Honma et al. ............... 358/300
5,420,694 A * 5/1995 Matsumoto ................. 358/462
5,655,208 A 8/1997 Sahay et al.
5,884,120 A 3/1999 Ito et al.
5,893,020 A 4/1999 Atsumi
6,029,023 A 2/2000 Munemori et al.
6,263,173 B1 7/2001 Nakamura et al.
6,636,711 B1 10/2003 Katahira
6,701,110 B2 3/2004 Ono
6,751,425 B2 6/2004 Fujimori et al.
6,788,907 B1 9/2004 Burkes et al.
6,865,355 B2 3/2005 Burkes et al.
7,106,981 B2 9/2006 Hashimoto et al.
7,130,064 B1 * 10/2006 Okamura et al. ........... 358/1.13
2004/0095594 A1 * 5/2004 Moro ........................ 358/1.13
2006/0132815 A1 * 6/2006 Lofthus et al. ............. 358/1.13
2007/0109573 A1 * 5/2007 Hirayama .................. 358/1.13
2008/0192274 A1 * 8/2008 Sugizaki ..................... 358/1.9

* cited by examiner

*Primary Examiner*—Robert Beatty

(57) ABSTRACT

A method for printing images on at least one substrate using an apparatus having a plurality of print modes, wherein at least one of the print modes is a monochrome printing mode and another of the print modes is a color printing mode, the method comprising: printing a first portion of the images in a first of the print modes; determining whether the images being printed in the first mode meet a predetermined criteria; switching the apparatus into a second of the print modes when the images then being printed in the first print mode meet the predetermined criteria; and printing a second portion of the images using the apparatus in the second of the print modes after the switching.

24 Claims, 2 Drawing Sheets

PRINTING DEVICE AND METHOD FOR SWITCHING BETWEEN MONOCHROME AND COLOR MODES

BACKGROUND OF THE INVENTION

Color laser printers typically have distinct color and monochrome print modes, each of which is capable of printing pages. Monochrome pages may typically be printed in either a monochrome or color mode, while color pages are printed in the color mode.

Printing monochrome pages in a color mode may increase wear on consumables within the printer, such as toner cartridges and print drums. Printing each color page of a print job in a color print mode and each monochrome page in the monochrome print mode requires switching between print modes between pages. Switching print modes between pages of the print job in this manner typically causes delays and may increase the wear on consumables. In order to prevent or reduce the switching time monochrome pages may be printed in color but at the expense of increased wear on the color cartridge. Alternative techniques that enable switching between print modes while minimizing switching delay are desired.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE PREFERRED EMBODIMENTS

The following description of the preferred embodiments is merely by way of example and is in no way intended to limit the invention, its application, or uses.

Figure 1:
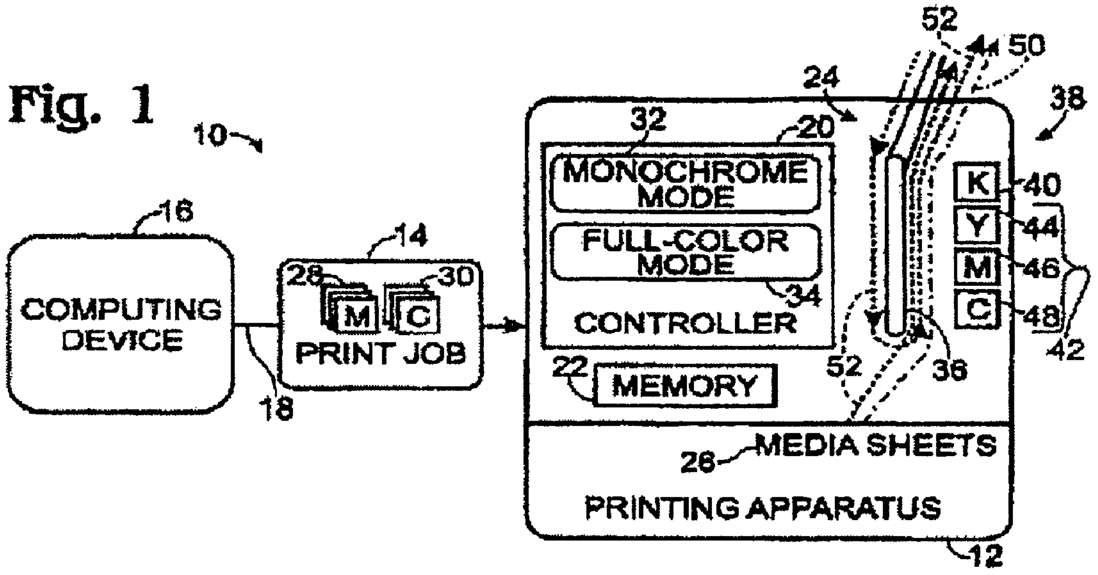
FIG. 1 illustrates a printing system.

FIG. 1 shows a printing system 10, including a printing apparatus 12 configured to receive a print job 14 from a computing device 16 received via a communication link 18.

"Computing device", as used herein, generally refers to a computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, generally refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further example only. Memory may take the form of internal or external disc drives, for example. Memory may be internal or external to an integrated unit including a processor. Memory preferably stores a computer program or code, e.g., a sequence of instructions being operable by a processor.

Computing link 18 may take the form of a local communications connection, such as a USB, parallel or serial data connection, or a computer network connection, for example. "Computer network", as used herein, generally refers to one or more mediums communicatively coupling two or more computing and/or peripheral devices (such as printing apparatus) together. There are many types of computer networks, including: local-area networks (LANs), wide-area networks (WANs), campus-area networks (CANs), metropolitan-area networks MANs), home-area networks (HANs) and the global interconnection of computer networks and computing devices commonly referred to as the Internet. Computer networks may typically incorporate wired and/or wireless links, switches and/or routers, for example.

Referring still to FIG. 1, printing apparatus 12 includes a controller 20, memory 22 and print mechanism 24. Controller 20 is typically configured to receive print job 14 into memory 22, and direct print mechanism 24 to print the pages of print job 14 on sheets of media 26, such as paper.

By way of non-limiting example, controller 20 may typically include a processor. The processor may typically include one or more CPU's. Memory 22 may include memory of a volatile nature and include RAM memory. Memory 22 may be internal or external to the processor. Memory 22 may include memory of a non-volatile nature, and include magnetic or optical storage capability, ROM memory and/or flash memory, for example. Memory 22 may include device driver code that is executed by the processor. According to an embodiment of the present invention, one CPU and memory pair may serve as a formatter and another CPU and memory pair may serve as an engine controller; one pair processes (rasterizes) the images and the second pair controls the print mechanism 24. Both of these pairs may be either contained in the print apparatus 12 or separately. Alternatively, a host based image processing may be implemented, where image processing (rasterizing) is performed on a host computing device 16.

Print job 14 may include monochrome pages 28 and/or color pages 30. "Monochrome page", as used herein, generally refers to grayscale and/or black-and-white pages, printed using only black toner or ink. "Color page", as used herein, generally refers to any page containing non-black/white or non-grayscale content. Thus, a page containing purple and white is a color page, while a page containing only black and white is a monochrome page. Controller 20 is configured to perform a color mode switching decision to select either a monochrome mode 32 or a color mode 34 in which to print each page of print job 14. In the illustrated embodiment, color mode 34 takes the form of a full-color mode, capable of printing different colors. Embodiments of the present invention will be further described in connection with an in-line, full-color/monochrome mode for non-limiting purposes of explanation only. The present invention is applicable to other mode combinations as well, such as where separate monochrome, cyan, yellow and magenta modes are available in different combinations for use.

In an in-line color printer configuration, print mechanism 24 typically includes an electrostatic belt 36 configured to drive print media 26 across a plurality of print cartridges 38, which apply ink or toner to the media to produce the printed image. Typically, a monochrome print mechanism (black print cartridge 40 in the illustrated embodiment) and one or more color print mechanisms (color print cartridges 42 in the illustrated embodiment) are provided. In the depicted embodiment, a cyan print cartridge 48, yellow print cartridge 44 and magenta print cartridge 46 are arranged along the travel path of the media. It will be appreciated that other print mechanisms may also be used, such as print mechanisms having cyan, magenta, and yellow elements combined in a single print cartridge, or print mechanisms that rotate print media around a print drum for multiple rotations, each rotation applying a separate color to the print media (e.g., a multi-pass configuration).

In full-color mode 34, print mechanism 24 is configured to print both color pages 30 and monochrome pages 28, using both black print cartridge 40 and color print cartridges 42. In monochrome mode 32, print mechanism 24 is configured to print monochrome pages 28, using only black print cartridge 40. It will be appreciated that while it may be possible to print color pages 30 in the monochrome mode, this will typically result in the color pages being printed in grayscale.

Print apparatus 12 is typically configured to print single-sided media sheets in a simplex mode. Print apparatus 12 may print double-sided media sheets in a duplex mode. In the simplex mode, media sheets 26 travel on belt 36 along a simplex path 50, such that only one side of the media sheet travels past the print cartridges 38. In duplex mode, media sheets 26 travel on belt 36 along a duplex path 52, such that a first side of media 26 passes print cartridges 38 in a first pass, and a second side of media 26 passes by print cartridges 38 on a second pass. In between the first and second passes, each media sheet is flipped, such that the first printed side of the media sheet adheres to the belt as the media sheet travels along the second pass. It will be appreciated that printing mechanisms utilizing other simplex and duplex paths may be utilized.

Figure 2:
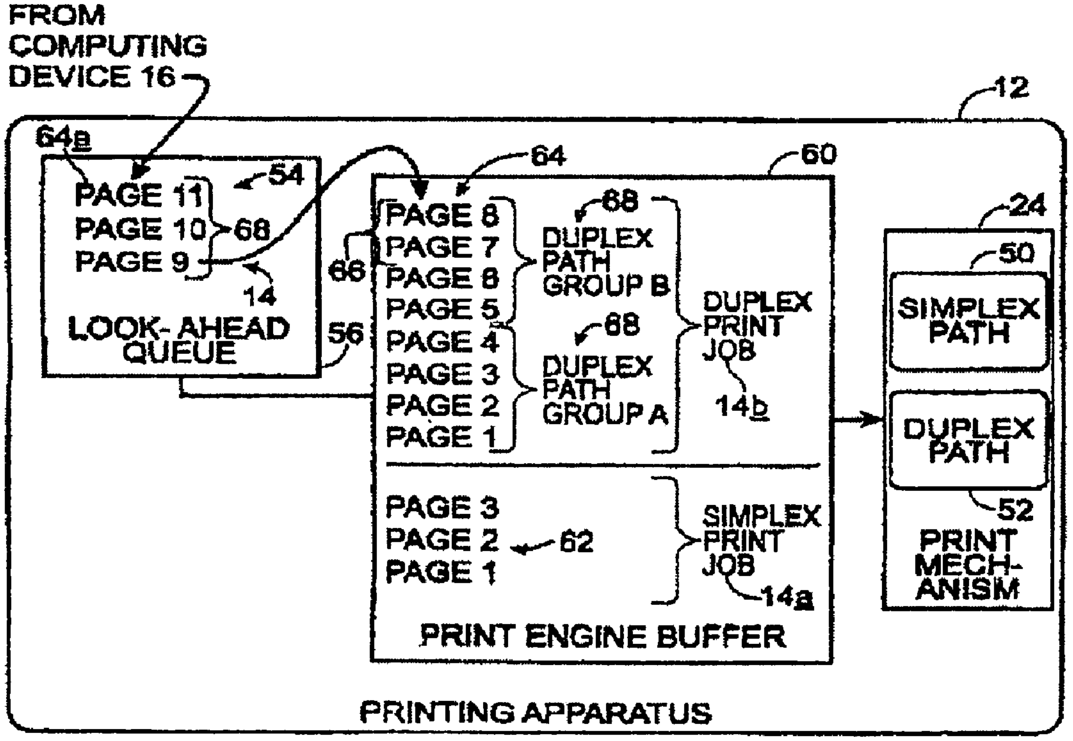
FIG. 2 illustrates a workflow of pages in a print job.

As shown in FIG. 2, a stream of incoming pages 54 of a print job are received in a queue 56 of printing apparatus 12 from computing device 16, before being passed to print engine buffer 60. Thus, the number of pages in queue 56 depends on the speed at which they are received from the computing device 16, and the backlog in print engine buffer 60. Print jobs may include simplex print jobs 14*a* and/or duplex print jobs 14*b*. Alternatively, the printing apparatus may be configured to print both simplex portions and duplex portions in a same print job.

As simplex print jobs and duplex print jobs stream through the printing apparatus, a decision is typically made whether to print the pages in a monochrome or full-color mode. In one approach, where a page to be printed incorporates color imagery, the entire print job (all pages) may be printed in the full-color mode. However, such an approach produces additional wear on printer parts and consumables where other pages in the print job are monochrome pages.

In another approach, pages to be printed that incorporate color imagery are printed in the full-color mode, while pages that include only monochrome imagery are printed in the monochrome mode. Apparatus 12 is switched between modes when media is not in contact with cartridges 38 (FIG. 1), such as between pages. This delays completion of the print job, however, as a delay while pages traverse path(s) 50, 52 (FIG. 1) is introduced. The delay is nonetheless conventionally considered necessary, as switching between modes while media is engaged with printing mechanism, such as cartridges 38, typically leads to print quality (PQ) defects. Switching between color and monochrome modes typically involves engaging and/or disengaging certain printing mechanisms, and mechanical elements, and results in mechanical and/or electrical load changes. These load changes typically result in PQ defects, as the difference in the rate at which belt 36, print cartridges 38, and other engine components move relative to one another changes, causing the toner or ink to be applied non-uniformly to media.

According to an embodiment of the present invention, switching between monochrome and color modes may occur when a portion of the image being printed meets a predetermined criteria. According to an embodiment of the present invention, the predetermined criteria may relate to the natural ability of the portion of the media sheet to conceal resulting PQ defects. For example, it has been discovered that printed areas that include half-tone image components, e.g., half-tone imagery, are particularly susceptible to PQ defects resulting from mode switching degrade image quality to a degree that a user will find unacceptable. Applicant has also discovered that areas that are composed of 100% black (in the form of text, line-art or solid fill, for example) or 100% white horizontal bands across the media page are not susceptible to PQ defects resulting from mode switching that a user will find unacceptable. It has also been discovered that page areas composed of monochrome text are not susceptible to PQ defects resulting from mode switching that a user will find unacceptable. Thus, by way of example only, if a current page is being printed in a monochrome mode, and the next page is to be printed in a full-color mode, a switch between modes may occur while a portion of the current page that is composed of 100% black (in the form of text, line-art or solid fill, for example) or 100% white is being printed, such as by a black toner cartridge. In such a case, the resulting current page may be largely printed in monochrome mode, while the next page may be printed full-color mode, without introducing additional delay and mitigating additional wear on printer parts and consumables.

Figure 3:
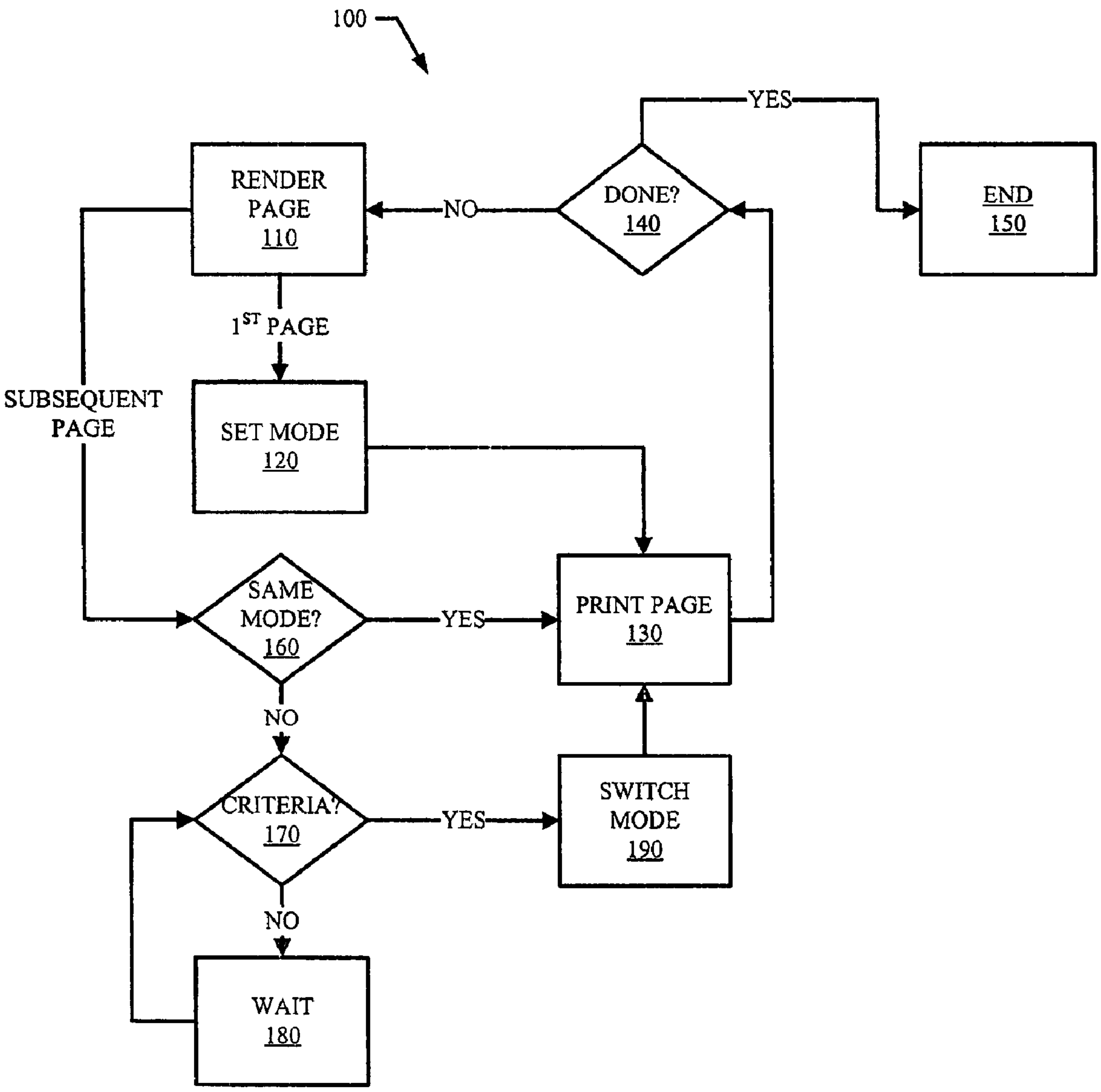
FIG. 3 illustrates a flow diagram of a process for printing images according to an embodiment of the invention.

Referring now to FIG. 3, there is shown a flow diagram of a process 100 for processing a print job and printing images on one or more sheets of media (e.g., substrates) according to an embodiment of the present invention. Process 100 may be embodied as controller 20 (FIG. 1) executable code being stored in memory 22 (FIG. 1). Process 100 commences with a page of the print job being rendered at block 110. “Render”, as used herein, generally refers to transforming, converting or interpreting digital information indicative of the page to be printed, in the form received from computing device 16 (FIG. 1), to a form suitable for producing the desired imagery on the media page using print mechanism 24 (FIG. 1).

When the page rendered at block 110 is the first page of the print job, the apparatus 12 (FIG. 1) mode is set at block 120 (e.g., printer apparatus 12 is set to full-color mode). At block 130, the rendered page is printed in the mode set at block 120. During printing, it is determined if the print job contains more pages to be printed at block 140. If not, processing ends at block 150 and the single printed page is output. When it is determined that another page is to be printed at block 140, processing returns to block 110, where the next page of the print job is rendered.

At block 160, it is determined if the next subsequent rendered page is to be printed using the same mode of the apparatus as used in the immediately preceding page, which may yet finish being printed at block 130 (e.g., if the apparatus is then set to monochrome mode, is the rendered page a monochrome page). If the mode is determined to be the same at block 120, the subsequently rendered page is printed at block 130, and processing returns to block 140.

If it is determined at block 160 that a different print mode is to be used then it is determined whether a print mode switch may be implemented without introducing PQ defects that a user would find objectionable. For example, at block 170 it may be determined whether a criteria for switching between modes is satisfied. By way of example, where the previous page was a monochrome page, and the subsequent page is a color page, it may be determined whether a portion of that previous page that is still to be printed (and large enough to have switching occur during printing thereof) is composed of content not prone to PQ defects, such as regions of white, or of 100% black text, or of sufficient density, like 98% or 100% black, and, if not, whether the previous page is done printing. If the determination is in the negative, it may be determined at block 170 that the switching criteria is not met, such that processing proceeds to block 180, and after a predetermined delay, returns to block 170. When the determination is in the affirmative, it may be determined at block 170 that the switching criteria is met, such as when the previous page has completely left the cartridge area, and processing proceeds to block 190.

At block 190, the printer apparatus is switched to another mode while the portion of the preceding page that satisfied the mode switch criteria at block 170 is being printed (at block 130). In this example a switch from the monochrome mode to the color mode was made, even though a media sheet may then have been engaged with print mechanism components, such as cartridge 40.

A similar methodology may be used to switch from color to monochrome print modes (e.g., where the previous page is a color page and the subsequent page is a monochrome page). Again, at block 170, it may be determined whether a criteria for switching between modes is satisfied. By way of example, where the previous page was a color page, and the subsequent page is a monochrome page, it may be determined whether at least a portion of the yet to be printed monochrome page is composed of 100% black, 100% white, or monochrome text content, and, if not, whether the previous page is done printing. When the switching criteria is met at block 170, processing proceeds to block 190. In such a case the printer apparatus is switched to the monochrome mode while the portion of the subsequent monochrome page that satisfied the mode switch criteria at block 170 is being printed (at block 130).

It should be recognized that while embodiments of the present invention have been described using a monochrome and color page basis, e.g., a page by page or inter-page basis, where each page is either considered monochrome or color, the same methodology may be used within a page, such that various portions of a page are considered to be monochrome or color, i.e., using an intra-page basis. In such an embodiment, switching between modes may essentially be suspended while images that are subject to PQ defects that a user will find objectionable, e.g., half-tone images, are being formed.

Further, it should be recognized that mode switching may be based on the color content of the document. For example, in a four cartridge (C, Y, M, K) configuration, if it is determined that the magenta (M) image does not contain an image type susceptible to mode switching induced PQ defects, a mode switch may be made without introducing additional delays, even though the C and/or Y images may contain PQ sensitive imagery.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for printing images on at least one substrate using an apparatus having a plurality of print modes, wherein at least one of the print modes is a monochrome printing mode and another of the print modes is a color printing mode, the method comprising:

printing a first portion of the images in a first of the print modes;

determining whether the images being printed in the first mode meet a predetermined criteria;

switching the apparatus into a second of the print modes when the images then being printed in the first print mode meet the predetermined criteria; and, printing a second portion of the images using the apparatus in the second of the print modes after the switching.

2. The method of claim 1, further comprising suspending switching while images then being printed do not meet the predetermined criteria.

3. The method of claim 1, wherein the predetermined criteria comprises the images then being printed are not halftone images.

4. The method of claim 1, wherein the predetermined criteria comprises the images then being printed being composed of a homogeneous region.

5. The method of claim 4, wherein the homogeneous region is at least 98% dense.

6. The method of claim 1, wherein the predetermined criteria comprises the images then being printed consisting of at least one of monochrome text, line-art and solid fill.

7. The method of claim 1, further comprising:

rendering at least a part of the first portion; and determining whether the at least part of the first portion satisfies the predetermined criteria dependently upon the rendering.

8. The method of claim 1, wherein the first portion is on a first page, and the second portion is on a second page.

9. The method of claim 8, wherein the switching occurs while a third portion of the images are being printed.

10. The method of claim 9, wherein: the first portion is monochrome; the second portion is color; and the third portion is monochrome.

11. The method of claim 9, wherein: the first portion is color; the second portion is monochrome; and the third portion is monochrome.

12. A printer apparatus comprising:

a monochrome printing mechanism;

a color printing mechanism;

a controller coupled to the monochrome and color printing mechanism; and a memory operatively coupled to the controller and storing controller executable code;

wherein execution of the controller executable code by the controller causes the monochrome printing mechanism to print monochrome images, the color mechanism to be engaged while the monochrome images then being printed by the monochrome mechanism meet a predetermined criteria, and the color printing mechanism to print color images after the color printing mechanism has been engaged.

13. The printer apparatus of claim 12, wherein execution of the controller executable code by the controller causes the color printing mechanism to print color images on at least one substrate, the monochrome printing mechanism to print monochrome images and the color mechanism to be disengaged while monochrome images then being printed by the monochrome mechanism meet a predetermined criteria.

14. The apparatus of claim 12, wherein the predetermined criteria comprises the images then being printed are not halftone images.

15. The apparatus of claim 12, wherein the predetermined criteria comprises a homogeneous region.

16. The apparatus of claim 12, wherein the predetermined criteria comprises the images then being printed being composed of monochrome text.

17. A printer apparatus comprising:

a monochrome printing mechanism;

a color printing mechanism;

a controller coupled to the monochrome and color printing mechanism; and a memory operatively coupled to the controller and storing controller executable code;

wherein execution of the controller executable code by the controller causes the color printing mechanism to print color images, the monochrome printing mechanism to print monochrome images and the color mechanism to be disengaged while monochrome images then being printed by the monochrome mechanism meet a predetermined criteria.

18. The apparatus of claim 17, wherein the predetermined criteria comprises the images then being printed are not halftone images.

19. The apparatus of claim 17, wherein the predetermined criteria comprises a homogeneous region.

20. The apparatus of claim 17, wherein the predetermined criteria comprises the images then being printed being composed of monochrome text.

21. A method of printing by a printer having a monochrome and a color printing mode, comprising:

receiving a print job that describes a monochrome image to be printed on a first page and a color image to be printed on a second page, where the second page immediately follows the first page;

printing, while in the monochrome mode, at least a first portion of the monochrome image on the first page;

determining if the monochrome image meets pre-determined criteria;

if the monochrome image meets the pre-determined criteria, then printing, while in the color mode, a second portion of the monochrome image on the first page;

if the monochrome image does not meet the pre-determined criteria, then printing, while in the monochrome mode, the second portion of the monochrome image on the first page.

22. The method of claim 21, further comprising: printing, while in the color mode, the color image on the second page.

23. A method of printing by a printer having a monochrome and a color printing mode, comprising:

receiving a print job that describes a color image to be printed on a first page and a monochrome image to be printed on a second page, where the second page immediately follows the first page;

printing, while in the color mode, at least a first portion of the color image on the first page;

determining if the color image meets pre-determined criteria;

if the color image meets the pre-determined criteria, then printing, while in the monochrome mode, a second portion of the color image on the first page;

if the color image does not meet the pre-determined criteria, then printing, while in the color mode, the second portion of the color image on the first page.

24. The method of claim 23, further comprising: printing, while in the monochrome mode, the monochrome image on the second page.

* * * * *